U S 0 0 5 0 9 9 4 3 5 A

United States Patent [19]
Collins et al.

[11] Patent Number: 5,099,435
[45] Date of Patent: * Mar. 24, 1992

[54] METHOD AND APPARATUS FOR CONVERSION OF OUTLINE CHARACTERS TO BITMAP CHARACTERS

[75] Inventors: John S. Collins, Boston; Michael Yudis, Belmont; Philip G. Apley, Allston, all of Mass.

[73] Assignee: Bitstream, Inc., Cambridge, Mass.

[*] Notice: The portion of the term of this patent subsequent to Nov. 15, 2005 has been disclaimed.

[21] Appl. No.: 331,494

[22] Filed: Mar. 31, 1989

[51] Int. Cl.⁵ .............................................. G06F 3/14
[52] U.S. Cl. ..................................... 395/150; 395/128
[58] Field of Search ................ 364/518, 521; 340/716, 340/721, 723

[56] References Cited

U.S. PATENT DOCUMENTS

| | | | |
|---|---|---|---|
| 4,511,893 | 4/1985 | Fukuda | 340/747 |
| 4,682,189 | 7/1987 | Purdy et al. | 364/523 |
| 4,785,391 | 11/1988 | Apley et al. | 364/518 |
| 4,959,801 | 9/1990 | Apley et al. | 364/518 |

*Primary Examiner*—Heather R. Herndon
*Attorney, Agent, or Firm*—Wolf, Greenfield & Sacks

[57] ABSTRACT

An outline representation of a character or symbol is treated as being composed of a set of zones formed in both the horizontal and vertical directions. The zones are completely character-specific. Each zone defines the extent of some feature of the character. The boundaries of the zones are mapped to specific pixel locations in a bitmap em-square of selected resolution and size. Additional interpolation zones are defined which are used to map all the points on the outline representation of the character that are contained within the interpolation zone, but do not coincide with a control edge, from the positions in the high-resolution em-square to a corresponding position in the low-resolution em-square. To maintain relationships between features, constraint functions may be defined which regulate the size of the control zones for a character at predetermined sizes. Control zones and interpolation zones are all derivatively linked to a basic set of horizontal and vertical control edges at the outline description level. Consequently, the number of computations needed is reduced and the speed with which a bitmap can be generated from the outline representation is increased.

39 Claims, 9 Drawing Sheets

```
                ; CHARACTER 'N'——202
              ⎧ CHAR_INDEX = 4
              ⎪ CHAR_ID = 110————204
         200 ⎨  CHAR_SETWIDTH = 548
              ⎩ CHAR_TYPE = SIMPLE

⎧ ; CHAR 4 CONTROLLED COORDINATE TABLE
              ⎪ NO_X_COORDS = 9
              ⎪ NO_Y_COORDS = 5
         210 ⎨  ; ORUS
              ⎪    0    21   93  181  250  301  375  463  527 ⟩——212
              ⎩    0    19  415  434  481 ⟩——214

⎧ ; CHAR 4 CONTROL ZONE TABLE
              ⎪ NO_X_CTRL_ZONES = 8 ——220
              ⎪ NO_Y_CTRL_ZONES = 4 ——222
              ⎪ ; FROM  TO   CONSTR
              ⎪     0    2     0
              ⎪     2    7     0
              ⎪     2    3     9    ; LC STRAIGHT STROKE    ⎫
              ⎪     7    6     9    ; LC STRAIGHT STROKE    ⎬ 228
         218 ⎨     3    4    16    ; LC LEFT INNER SERIF   ⎪
              ⎪     6    5    17    ; LC RIGHT INNER SERIF  232
              ⎪     7    8    17    ; LC RIGHT OUTER SERIF  ⎫
              ⎪     2    1    16    ; LC LEFT OUTER SERIF   ⎬ 226
              ⎪ ; FROM  TO   CONSTR
              ⎪     0    4    23    ; LOWER CASE ROUND HEIGHT ⎫ 230
              ⎪     0    1     1    ;
              ⎪     4    3     1
              ⎩     3    2     0

⎧ ; CHAR 4 INTERPOLATION ZONE TABLE
              ⎪ NO_X_INT ZONES = 7 ——238
              ⎪ NO_Y_INT ZONES = 6 ——240
              ⎪ ; FROM  FADJ   TO   TADJ ⎫
              ⎪     3    0      4    0
              ⎪     3    0      6    0
              ⎪     5    0      6    0
              ⎪     7    0      8    0   ⎬ 242
              ⎪     3    0      7    0
              ⎪     1    0      3    0
         236 ⎨     1    0      2    0   ⎠
              ⎪ ; FROM  FADJ   TO   TADJ ⎫
              ⎪     3    0      4    4
              ⎪     1    0      2    0
              ⎪     1   350     2    8
              ⎪     1    0      2    8   ⎬ 244
              ⎪     1    0      4    0
              ⎩     1   387     4    0   ⎠
```

FIGURE 9B

```
; CHAR 4 CHARACTER DATA
       OUTLINE_DATA
294 ─── BBOX    C21 C0  C527 E485 0
       MOVEO   C21 C0
       XINT 0              ─── 246
       YINT 1              ─── 248
250 ─── LINE    C250 C0
       LINE    C250 C19    ─── 252
256 ─── CRVE    A195 A20 C181 A39 C181 A93
       LINE    C181 A369          260
       XINT 1              258
       YINT 2
       CRVE    A211.160 A399.160 A247.168 A422.638 A289.786 A422.638
       YINT 3
       CRVE    A293.799 A422.638 A297.870 A422.430  A302 A422
       CRVE    A367 A415 C375 A350 C375 A297
       LINE    C375 A87
       XINT 2
       CRVE    C375 A31 A352 A20
       LINE    C301 C0
       LINE    C527 C0            C301 C19
       XINT 3
       YINT 4
       CRVE    A482 A22 A462 A33 C463 A81
       LINE    C463 A296
       XINT 4
       CRVE    C463 A370 A461 A464 A369 A479
       CRVE    A359.801 A480.492 A350.803 C481  A341.996 C481
       YINT 5
       CRVE    A279.957 C481 A227.411 A446.282  C181 A406
       XINT 5
       YINT 0
       LINE    C181 A485
       CRVE    A129 A464 A77 A443   C21 C434
       LINE    C21 C415
       XINT 6
       YINT 1
       CRVE    A84 C415 A94 A414   C93 A350
       LINE    C93 A97
       CRVE    C93 A38 A83 A21   C21 C19
       LINE    C21 C0        262
       END
```

{ 268

{ 264

```
;;;;;;;;;;;;;;;;;;;;;;;;;;;;;;;;;;;;;;;;;;;;;;;;;;;;;;;;;;;;;;;;;;;;;;;;
;;  CHARACTER = "o"                      FIGURE 11                    ;;
;;;;;;;;;;;;;;;;;;;;;;;;;;;;;;;;;;;;;;;;;;;;;;;;;;;;;;;;;;;;;;;;;;;;;;;;
CHAR_INDEX = 5
CHAR_ID = 111
CHAR_SETWIDTH = 545
CHAR_TYPE = SIMPLE

;; CHAR 5 CONTROLLED COORDINATE TABLE
NO_X_COORDS = 5
NO_Y_COORDS = 5
; ORUS   0   32   127   412   505
  -12    0   18   458   486

;; CHAR 5 CONTROL ZONE TABLE
NO_X_CTRL_ZONES = 4
NO_Y_CTRL_ZONES = 4
;   FROM  TO  CONSTR
     0     1    0
     1     4   10
     2     3   10                    ; LC ROUND STROKE
     4     0   10                    ; LC ROUND STROKE
;   FROM  TO  CONSTR
     0     4    0
     1     4   23
     4     3   10                    ; LC ROUND HEIGHT
     0     2   10                    ; LC HAIRLINE
                                     ; LC HAIRLINE

;; CHAR 5 INTERPOLATION ZONE TABLE
NO_X_INT_ZONES = 2
NO_Y_INT_ZONES = 2
;   FROM  FADJ  TO  TADJ
     1     0    4    0
     2     0    3    0
;   FROM  FADJ  TO  TADJ
     0     0    4    0
     2     0    3    0
```

FIGURE 11 (CONTINUED)

```
;CHAR 5 CHARACTER DATA
OUTLINE_DATA
BBOX    C32 C-12 C505 C486
XINT 0
YINT 0                                                    ⎫
276—MOVEO  C32  A230                          272         ⎪
    CRVE   A33.956   A68.651   A149.943 C-12  A266.583 C-12⎪
    CRVE   A385.562  C-12      C505 A71.934   C505 A241.294⎬ 270
    CRVE   C505 A245.477       C505 A249.713  C505 A254    ⎪
    CRVE   A500.673  A410.741  A389.777 C486   A276.456 C486⎪
    CRVE   A155.579  C486      C32 A400.355    C32 A236.129⎪
    CRVE   C32 A234.098        C32 A232.055    C32 A230.274⎭
XINT 1
YINT 1                                                    ⎫
282—MOVEI  A130 A223                          284         ⎪
    CRVE   A128.362  A238.102  C127 A254.627   C127 A271.697⎪
    CRVE   C127 A348.441       A148.377 A436.185  A231 A455⎪
    CRVE   A240.598  A457.194  A249.778 C458    A258.548 C458⎬ 280
    CRVE   A345.713  C458      A392.280 A356.230 A405 A279  ⎪
    CRVE   A408.999  A254.472  C412 A225.891    A412 A196.822⎪
    CRVE   C412 A116.861       A389.273 A33.201  A302 A20   ⎪
    CRVE   A294.603  A18.852   A287.486 C18      A280.642 C18⎪
    CRVE   A180.160  C18       A138.426 A136.867 A130 A223  ⎭—286
END                                                         290
```

FIGURE 12

```
; CONSTRAINT TABLE
NO X CONSTRS = 21
NO Y CONSTRS = 22
;  LIMIT  ORUS  OFFSET   MIN  CONSTR
   15     133   511      1
   30     500   -1.4142  5
                          0
                          0
                          0
                          0
                          0
   100    85             0
   100    85             0
                          1
   11            0        1   12 ; LC STRAIGHT STROKES
   12     100   0        0   13 ; LC ROUND STROKES
   13            0        0   14
   14     100   0        0
   20     500   0        0
   30     300   0        0
   100    120  0         0
   30     85   0         1   19 ; LEFT SERIF
   255    95   0         1      ; LC RIGHT SERIF
   15     50   0         1      ; UC ROUND STROKES
   15     50   0         0      ; UC TO LC STRAIGHT STROKES
                                ; UC STRAIGHT STROKES
                                ; UC INNER SERIFS
                                ; UC OUTER SERIFS
```

Note: Table rotated 90° in original. Columns include X indices 2–22 marked with X. Labels at right correspond to constraint rows: LC STRAIGHT STROKES, LC ROUND STROKES, LC LEFT SERIF, LC RIGHT SERIF, UC ROUND STROKES, UC TO LC STRAIGHT STROKES, UC STRAIGHT STROKES, UC INNER SERIFS, UC OUTER SERIFS.

FIGURE 12 (CONTINUED)

```
  50  1000  -512    1   0  ; Y2
 255   400   .75    0   0  ; Y3
   0     0     0    0   0  ; Y4
   0     0     0    0   0  ; Y5
   0     0     0    0   0  ; Y6
   0     0     0    0   0  ; Y7
   0     0     0    0   0  ; Y8
   0     0     0    0   0  ; Y9
   0     0     0    1   0  ; Y10  LC HAIRLINES
  30     4     0    0   0  ; Y11
   0     0     0    0   0  ; Y12
   0     0     0    0   0  ; Y13
   0     0     0    0   0  ; Y14
   0     0     0    0   0  ; Y15
   0     0     0    0   0  ; Y16
   0     0     0    1   0  ; Y17  LC ROUND HT TO LC SQUARE HT
 600   470     0    3   0  ; Y18  H BAR
 500    39     0    3   0  ; Y19  SERIF THICKNESS
 200    21     0    3   0  ; Y20  CAP H HEIGHT
 300   692     0    0 200  ; Y21  CAP O HEIGHT
 200   707     0    0  17  ; Y22  LOWER CASE SQUARE HEIGHT
 100   470     0    0   0  ; Y23  LOWER CASE ROUND HEIGHT
       470                 ;
```

METHOD AND APPARATUS FOR CONVERSION OF OUTLINE CHARACTERS TO BITMAP CHARACTERS

BACKGROUND OF THE INVENTION

1. Field of the Invention

This invention relates to the art of generating digital representations of alpha numeric characters or other symbols. More particularly, it relates to the generation of bitmap representations of characters at selectable resolutions and point sizes, from digital representations of their outlines.

2. Discussion of the Prior Art

The field of electronic typographic and image composition has given birth to a large variety of display devices and printing systems for making visible in printed or other form (e.g., on a video display screen) alphanumeric and other characters and symbols. (Hereafter the term "output device" will be used generically, to include all types of print and non-print output devices.) This field includes, but is not limited to, electronic typesetting and publishing systems, full page composition systems, word processing systems, and all of their output devices. In such systems, each character or symbol must be supplied, at some point in the systems, as digital information from which the character form may be constructed on each output device. The digital data will generally have to be compiled or generated in a way which takes into account specific characteristics of the output device, such as its resolution, and specific characteristics of the image to be displayed, such as the point size desired for typographic material.

A large number of typefaces are in popular use. The generation of each character or symbol in each typeface desired, at each point size to be used, can be a substantial undertaking. For a small manufacturer, the cost of developing all of this material could make the effort quite impractical. And when a new output device is developed, with different characteristics, it could be necessary to prepare a new digital data set for characters adapted thereto. This can make it quite expensive to take advantage of improvements in output technology as they become available.

Fortunately, it is not necessary to start "from scratch" each time a character set, font, or symbol is needed. Digital forms of a large number of typefaces and other symbols are available from a number of suppliers. However, these suppliers frequently will not have a digital representation in a form which meets the user's requirements or the characteristics of his output device. The typeface supplier generally wants to establish as its "master" digital version of a character a form which is as close to an analog form as possible—that is, a form which is virtually independent of output device characteristics and the point size at which characters are to be viewed. The most frequently employed approach is to store an encoded representation of the outlines of each of the characters. The location and shape of the outline is defined using a normalized coordinate system whose resolution is considerably finer than the resolution of any conceivable output device for any reasonable selection of point size. Several techniques are available for encoding character outlines. These range from storing every point on the outline to storing closely spaced points which can be connected by straight lines to storing only selected "control points" which define the curves and straight lines of a character according to a known set of rules. The use of outline encoding reduces the amount of memory needed to store a typeface and provides a size-independent character representation. However, most output devices will not accept the encoded outline character data; they require that characters be represented in a so-called "bitmap" form, as a list of numbers locating the position of each point in the character shape (i.e., not only every point on the outline, but every point in the interior of the character, as well). A translation or transformation is therefore required from the outline form to the bitmap form.

To understand the nature of this transformation, start by considering the display medium as a rectangular grid of $N \times M$ locations, each location representing a single picture element (or "pixel") which may be turned on (to display a part of a character) or left turned off (to represent background). The state of each picture element can be represented by a single bit whose value is either zero or one (of course, additional bits can be added to represent color, intensity or other attributes). When a character is stored in bitmap form, it is represented in a memory as a bit pattern corresponding to the intended illumination of picture elements on the display. The whole display field is represented in a memory array as an assemblage of bitmap characters.

Smaller-sized characters are made up of fewer pixels than larger characters and have smaller bitmap representations. It is thus necessary to make available for each character which is to be displayable, a separate bitmap representation in each required size. Further, since each bit in the memory corresponds to a selectable pixel location on the display, and pixel locations depend on display resolution, a separate bitmap representation is required for each different resolution output device. Therefore, although the outline representation of a character can be done at a sufficiently high resolution as to be independent of size and display resolution for all practical intents, the bitmap representation is necessarily dependent on the point size to be displayed and the resolution of the output device.

Frequently, important points on the ideal outline locus of a character will fall between the available pixel locations on the display field, requiring that choices be made as to which of the available pixels to use to represent those portions of the outline. And as a character is scaled up or down in size, certain adjustments may have to be made to account for the human visual perception mechanisms which cause the character to be viewed as having specific qualities. For example, as point size is changed, it is often appropriate that the height and width of the character be varied by slightly different scaling factors.

A still further complicating factor is the fact that for typographic consistency, certain characterizing features and relationships between features of different characters must be preserved through the outline-to-bitmap conversion process. For example, the heights of certain portions of specified letters must be kept the same, the widths of certain portions of letters must be maintained in a desired relationship, and so forth. Failure to preserve these relationships will cause loss of the typeface's design identity and typographic quality.

The promotion of the appearance of unity between the characters in a typeface has sometimes been accomplished by using conventional signal processing techniques such as filtering. That approach, however, provides improved uniformity (e.g., in the thickness of lines) only at the expense of diminished resolution. This is a direct consequence of performing operations on character spectra rather than operating on character features.

The conversion of outline representations of typefaces to bitmap representations of selectable point size and resolution presents difficulties when achievement with an automatic system is sought, particularly where typographic design integrity is to be maintained in the bitmap product. The key to preserving typograpic consistency at different resolutions and point sizes lies in maintaining typograpically significant intracharcter and intercharacter relationships. Until very recently, high quality conversion has required considerable human "polishing" or editing of any bitmap which has been generated from an outline form by an automated system. This manual editing is, of course, expensive and time consuming. Moreover, since editing is required for each point size, a system cannot be provided with an ability to select an arbitrary point size for type. This restricts the user to just those point sizes for which edited type has previously been created.

In order to overcome these limitations, a number of methods have been developed for automated bitmap character generation from outlines. For example, U.S. Pat. No. 4,785,391, which is incorporated herein in its entirety by reference for background and which is assigned to the same assignee as the present invention, describes a method which uses a symbolic feature specification system which establishes a bridge between the outline form of the character and the bitmap form. This system links typographic features (both within individual characters and between different characters) and selectively arranges them hierarchically in order of importance.

The feature specification taught in U.S. Pat. No. 4,785,391 treats the em-square containing a character as being composed of a hierarchy of zones formed in both the horizontal and vertical directions. The zones are completely character-specific. Each zone defines the extent of some feature of the character, as selected by the operator of a computer-aided design (CAD) station. The available pixels are allocated first to the most important features, and then to successively less important features.

Although the method described in U.S. Pat. No. 4,785,391 maintains high typographic quality and consistency, it may, at times, employ computationally intensive techniques.

Another method for producing a scaleable typeface data is taught by U.S. Pat. No. 4,675,830. The method stretches and compresses character contours to bring specified contour points into proper alignment with a bitmap grid. The method breaks the character contour into segments which connect a pair of specified contour points. The method then offsets all the coordinates in the segment in order to bring one of the specified contour points into alignment with the bitmap grid. Finally, the method effects linear scaling of the segment with a scale factor in order to bring the second specified contour point into alignment with the bitmap grid.

Since the specified contour points described in U.S. Pat. No. 4,675,830 do not necessarily relate to typographic features, normally this means that there are more contour segments when compared to the method disclosed in U.S. Pat. No. 4,785,391. Consequently, since the method of U.S. Pat. No. 4,675,830 requires a separate transformation for each segment defined on the character outline, it can be extremely computationally slow when compared with either the method taught in U.S. Pat. No. 4,785,391 or the method of the present invention.

It is therefore an object of the present invention to provide a system which can more efficiently convert outline representations of individual characters and typefaces to corresponding bitmaps of those characters and typefaces within a wide range of sizes and display resolutions.

A further object of the invention is to provide a system for conversion of character outline data to corresponding bitmap data with only minimal human intervention or involvement, while maintaining a high level of typographic quality.

Still another object of the invention is to provide a simpler and faster mechanism for converting into bitmap form character information stored in outline form, while at the same time having sufficient flexibility in the mechanism to allow high typographic quality to be maintained Yet another object of the invention is to provide an improved method for converting into bitmap form character information stored in outline form, based on knowledge of the features of the characters rather than their spectral properties.

SUMMARY OF THE INVENTION

The present invention achieves these objectives through the use of a symbolic feature specification system which establishes a bridge between the outline form of the character and the bitmap form. All the information needed to scale a character is contained in the data structure which describes the character. The description of a particular character is completely independent from any other characters. The method for identifying features provides a size-independent constraint description of characters, which is then usable in conjunction with outline character data to translate size- and resolution independent outline characterizations into character bitmaps at any desired size and resolution.

The feature specification system of the present invention treats the em-square containing the character as being composed of a set of control edges formed in both the horizontal and vertical directions. The edges are character-specific. The zones that are formed between any two paired horizontal or any two paired vertical control edges define the relationship or extent of a particular typographic feature of the character. Arbitrarily-sized interpolation zones are then assigned and interpolation is performed in order to assign the number of output device pixels to be allocated between paired control edges in the character.

The foregoing and other objects, features, and advantages of the present invention will be more readily understood and apparent from the following detailed description of the invention, which should be read in conjunction with the accompanying drawing, and from the claims which are appended at the end of the detailed description

BRIEF DESCRIPTION OF THE DRAWING

In the drawing,

FIG. 2(a-d) is a pictorial illustration of the visual effects of different display resolutions and character sizes;

DETAILED DESCRIPTION OF AN ILLUSTRATIVE EMBODIMENT

Figure 1:
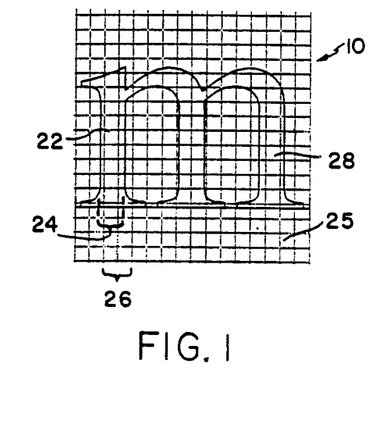
FIG. 1 is a diagrammatic illustration of a high resolution outline of an exemplary letter "m" laid against a much lower resolution grid.

For purposes of illustration, reference is now made to the lower case letter "m" shown in FIG. 1 on a rectangular coordinate grid 10. The grid 10 is intended to represent a medium to low resolution display field for an output device which might be capable of showing, for example, 100-300 dots per inch (dpi). By contrast, the letter "m" is shown as a high resolution outline. Typical outline encoding systems define character features on a coordinate definition system providing several thousand lines to the em. It is not feasible, of course, to show in the drawing a coordinate grid of such density; consequently, only the resulting character outline is illustrated. The assignee of the present invention, Bitstream, Inc., Cambridge, Mass., for example, uses a system providing 8,640 lines to the em in both the horizontal and vertical directions. The outline of the letter "m" (and each other symbol which is to be made available) is encoded at this high resolution and stored in digital form. Various techniques are described in the literature for effecting appropriate digital coding of character outlines; see, for example, J. Flowers, "Digital Type Manufacture: An Interactive Approach," *I.E-.E.E. Computer*, Vol. 17, No. 5, May 1984, at 40-48; W. Richmond, "Digital Masters," *Communication Arts*, May-June 1984, at 78-81.

Figure 2:
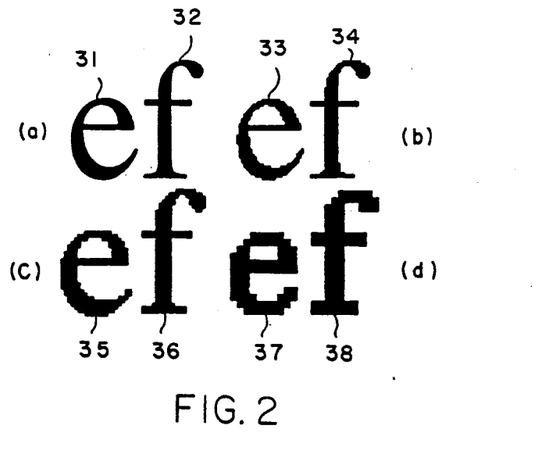

As stated above, the mapping of a character outline from a high resolution form to a lower resolution form is a complex task. With great frequency, features of the outline will not fall directly on available pixels but will, instead, fall between them. This is a direct consequence, of course, of a substantial reduction of resolution from the 8640×8640 line em-square. Consider, for example, the left stem 22 of the letter "m" in FIG. 1. Ideally, the width of the stem might be as represented at brace 24. However, due to the coarseness of the display resolution, it may not be possible to display a segment of that precise width. There are only two alternatives: the stem 22 may be wider or it may be narrower. In the extreme, the choice may have to be made between using one pixel or no pixels (possibly losing the feature entirely, or at least somewhat altering its shape). Thus in FIG. 1, if each box 25 represents one pixel, the stem 22 may be made two pixels wide, as shown by the brace 26, or it may be only one pixel wide. And at the lowest resolutions, curves become virtually non existent and straight lines dominate. FIG. 2 shows another series of illustrations which demonstrate the inverse relationship between the quality of a digital type image and the output resolution of the output In FIG. 2(a), the images 31 and 32 were set at 96 points on a 650 dots-per-inch (dpi) output device; the images appear virtually analog to the naked eye. More and more typographic detail is lost as the digital bitmap becomes coarser. FIG. 2(b) shows the same characters at 33 and 34, set at eight points on the same 650 dpi display. At twelve points on a 300 dpi display, the corresponding images 35 and 36 are shown in FIG. 2(c). Finally, at six points on a 300 dpi display, the images are as presented at 37 and 38 in FIG. 2(d), where a great deal of the detail of the analog form has been lost.

Another problem which occurs when mapping characters from one resolution to another is to maintain those correspondences between features which give a typeface its visual identity. For example, referring back to FIG. 1, it might be desired that the left and right stems 22 and 28 of the letter "m" have the same relative width (or thicknesses) in the low resolution form as they did in the high resolution form. When a number of such criteria apply to a given character, it may not be possible, as the resolution is decreased, to maintain all of these desired relationships. At that point it is necessary to sacrifice some relationships in order to preserve others.

It may also be desired to preserve relationships between the features of different characters. For example, it may be desired to make the width of the left stem 22 of the letter "m" the same as the width of the corresponding portion of the letter "n" (or some other letter). Or one might wish to ensure that the heights of two letters such as a lower case "a" and a lower case "o" are the same. The list of potential relationships is limitless.

Figure 3:
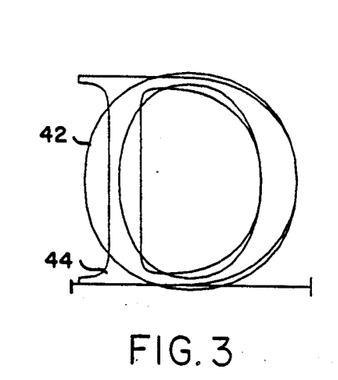
FIG. 3 is a pictorial illustration of an outline for an upper case letter "O" superimposed on an outline for an upper case letter "D" in the same typeface, as they appear on a 100 dpi output device, where the outlines have been encoded at 52,000 dpi effective resolution.

Of course, the maintenance of typographic quality is not simply a matter of mechanically preserving correspondences. In the example shown in FIG. 3, the goal is to generate bitmaps for the analog "O" 42 and "D" 44. At first, the procedure appears to involve a straightforward task of forcing the heights, arch thicknesses and widths of the "O" and "D" to correspond. Consider, however, bitmap versions of those letters which have been produced using customary prior art techniques, as in FIG. 4(A). Distortions are apparent even to an untrained eye. For example, the bottom segment 45a of the O (42'), is of a different length than the top segment, 45b. And the lower arch 46a is shaped differently from the top arch 46b. In the D (44'), there is a break 47 in the connection between the upper end of the arch and the stem. And the ends of the lower arch 48a and upper arch 48b do not terminate symmetrically.

Figure 4:
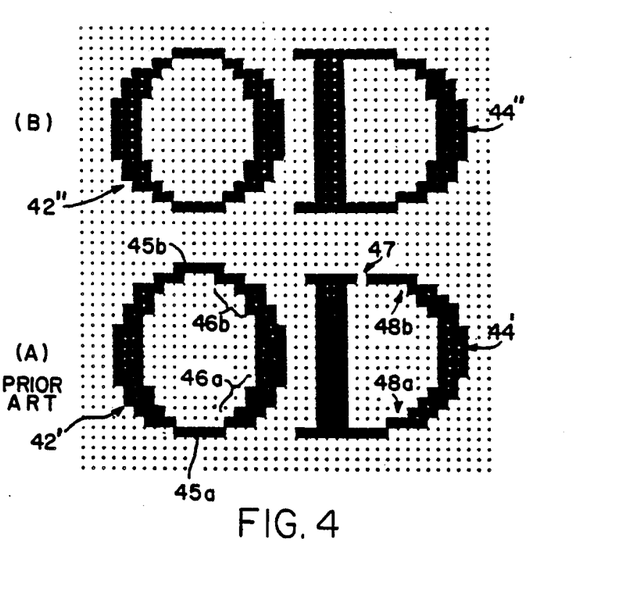
FIG. 4(A) is a pictorial illustration of conventionally generated bitmaps for the letters O and D of FIG. 3.
FIG. 4(B) is a pictorial illustration of bitmaps for the letters O and D of FIG. 3, generated according to the present invention.

By contrast, use of the present invention yields the bitmapped O (42") and D (44") of FIG. 4(B). There, symmetry has been maintained and the shapes of the characters correspond as nearly as possible to their analog forms 42 and 44.

According to the present invention, the preservation of correspondences between features in the higher resolution outline version of characters and their lower resolution bitmap counterparts starts with identification of those typographically significant features and labelling them in the file which defines outline versions of the characters. Thus, the initial feature labelling is, at least for most practical purposes, resolution-independent.

A character consists of one or more closed contours defined in a high resolution coordinate system, which usually is a cartesian coordinate system. The present invention makes use of character outlines that consist of vectors and Bezier curves, however, the method of the present invention would work with other different representations of character outlines. A typical high resolution character outline 50 for the letter "n" is shown in FIG. 5.

Figure 6:
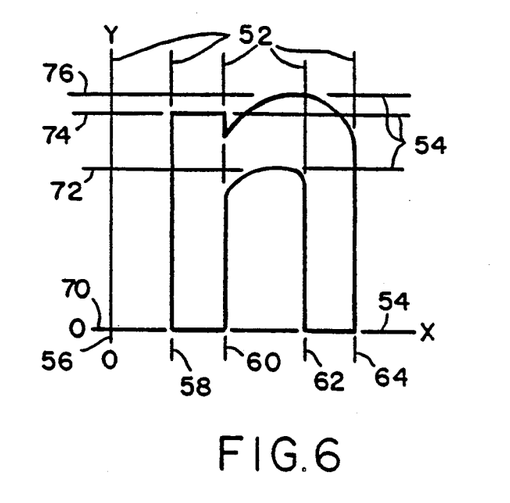
FIG. 6 is a diagrammatic illustration of the x-direction and y-direction control edges, superimposed on the character outline of the letter "n" of FIG. 5.

Features are identified within the high resolution character through the use of control edges. Control edges identify those x and y coordinates that should fall on pixel boundaries after transformation into output device coordinates. Control edges in the x-dimension can be visualized as vertical lines. Control edges in the y-dimension can be visualized as horizontal lines. A set of x control edges 52 and y control edges 54 which define selected typographically important characteristics of selected letter "n" is shown in FIG. 6.

Figure 5:
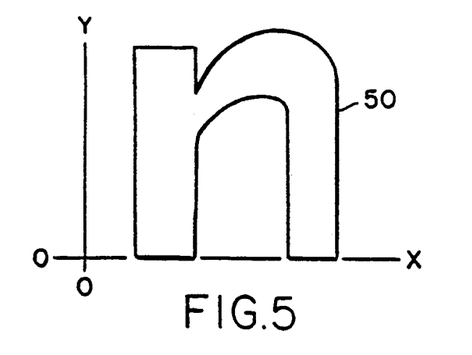
FIG. 5 is a diagrammatic illustration of a high resolution outline representation for the letter "n"

As depicted in FIG. 5, there is one x and one y control edge which form the basic control edges for each character with respect to the high-resolution em-square. These control edges are always located at the coordinates x=0 and y=0 in the high-resolution em square. In FIG. 6, control edge 56 represents the basic x control edge for the letter "n". Control edge 70 represents the basic y control edge for the letter "n". Further, control edges 58, 60, 62, and 64 represent the x-coordinate locations of the letter "n" which should fall on pixel boundaries when the transformation is made from the high resolution outline character to the lower resolution output device bitmap format. At the same time, control edges 72, 74, and 76 represent the y-coordinates of the high-resolution outline "n" which should fall on pixel boundaries when the transformation is made from the high resolution outline format to the lower resolution output device bitmap format.

It should be noted that control edges do not have to coincide with any extrema, horizontal, or vertical lines of the outline form of the character. Control edges may be placed, for example, at a predetermined distance from a particular feature of a character if the type designer deems that it is important to control the distance between the control edge and the particular feature of a character.

Having now identified the features within the high-resolution outline character through the use of x and y control edges, the relationship between the control edges needs to be established. In the illustrative example, the relationship between control edges is established by control zones. A control zone is created by established a pairing between two control edges. X control zones must connect pairs of x control edges. Y control zones must connect pairs of y control edges. The high resolution character in the em-square containing the character is sliced into "zones" of differing lengths in both the horizontal and vertical directions Each zone establishes a run-length segment which defines the span and placement of the selected features within the em-square. It should be carefully noted that all control zones are derived from the basic control edges at (x, y) coordinates of (0, 0) which are present in all characters. Therefore, the relationship between control edges in both the x and y direction is maintained, as the character is scaled in size or transformed into any desired output resolution.

Figure 7:
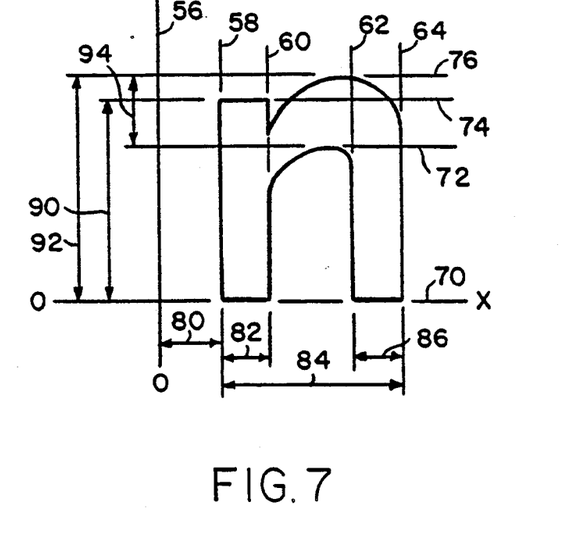
FIG. 7 is a diagrammatic illustration of the x-direction and y-direction control zones between the control edges of the letter "n" of FIG. 6.

As an example, FIG. 7 illustrates how control zone assignments might be made, using the lower case "n" as test case. To make the zone assignments, the outline form of the character 50 is displayed on the CAD workstation screen, and the operator moves a pointer to successive x and y locations which he then labels as the control edges. The operator then pairs control edges to define, or assign, the beginnings and ends of control zones. In the example of FIG. 7, control zone 80, which spans the distance between x control edge 56 and x control edge 58, would be the first x control zone to be defined. Control zone 82, which spans control edges 58 and 60, would be the second x control zone to be assigned. Next, control zone 84, which spans control edges 58 and 64, would be the next control zone to be assigned. Finally, control zone 86, which spans control edges 64 and 62, would be the final control zone assigned in the x direction. The assignment of control zones normally continues until all important typographic features have been determined. Some control zone assignments can be automated by using expert systems or other knowledge based processing systems.

The position of x control edge 58 is defined relative to x control edge 56. X control edge 60 is then defined by x control zone 82, relative to x control edge 58. X control edge 64 is then defined by x control zone 84, relative to x control edge 58. Finally, x control edge 62 is defined by x control zone 86, relative to x control edge 64. Consequently, the relationship of typographic features to one another will be maintained, since the control zones and control edges are derived from known control edges.

For proper completion of the zone assignments, it is necessary that (1) there is a control edge at the origin of the character, (2) the number of control zones must be one less than the number of control edges, and (3) every control edge has at least one control zone connected to it. Once these conditions are met, the pixel position of all control edges can be determined. The number of output device pixels in a control zone is computed by scaling the length of the control zone in outline resolution units into pixels in the lower resolution output device format. The value resulting from the scaling operation is normally rounded to the nearest whole number of pixels. Thus, the number of pixels in the control zone for the required output resolution and size can be determined. Consequently, the number of pixels contained in a control zone enables the position of the control edge at one end of the control zone to be calculated when the position of the control edge at the other end of the control zone is known.

After the positions of all the x control edges have been computed by determining the size in output device pixels of the control zones connecting all of the control edges, a similar process is used to compute the positions of all of the y control edges. With reference to FIG. 7, y control edge 70 is at the origin, whose position is defined as y=0 in output device coordinates. The position of control edge 74 relative to control edge 70 is determined by the length of control zone 90. The length of control zone 90 is scaled into output device pixels and rounded to the nearest whole number. Next, the position of control edge 76 may be calculated from the length of control zone 92. The length of control zone 92 connecting control edges 70 and 76 is scaled into output device pixels and rounded to the nearest whole number. Finally, the position of y control edge 72 is determined by the length of control zone 94, which spans control edges 76 and 72. Since the position of control edge 76 has been determined by the length of control zone 92, the length of control zone 94 is calculated from control edge 76 and scaled into output device pixels, which are then rounded to the nearest whole number.

There are many possible ways of setting up control zones to meet all of the conditions outlined above. Some arrangements produce better typographic output quality results than others. Considerable typographic experience is required to choose an arrangement of control edges and control zones that produces high-quality output for the required size and resolution range.

The use of control zones ensures that equal sized parts of characters always get an equal number of pixels after scaling. While this is one of the most important requirements when effecting intelligent character scaling, it alone is not sufficient in practice to produce high-quality output typography.

Typographic characters are frequently drawn with subtle variations to produce apparent optical consistency. For example, round bottomed characters dip below the baseline in order to make them appear to be sitting on the baseline. Given a particular output resolution for the typographic characters, a control zone defining the extent of a particular typographic subtlety may give unwanted results at smaller point sizes. For example, consider the vertical stems of the letter "n" as depicted in FIG. 7. For type design purposes, control zones 82 and 86 may be of slightly different lengths, thus making the left and right stems of the letter slightly different in width. As the size of the letter "n" is decreased, the effect of rounding errors is to make single pixels increasingly more significant as a proportion of feature size. For example, there will come a character size at which the difference between the width of the two stems, given the constant output resolution, will become objectionable. Consequently, in order to maintain typographic consistency, control zones of possibly differing lengths in high resolution form must be constrained to have equal lengths below a certain character size. However, by making the constraint apply only below a specified size, typographic subtlety is allowed to exist in large characters at high resolution, but inhibited for small characters at low resolutions. This avoids the situation where a small difference may be magnified to a whole pixel for very small characters and consequently appear as a huge relative difference. Therefore, constraints on control zones can be used to guarantee that groups of zones receive equal numbers of pixels at any scaling factor, even if there are slight variations in the actual lengths of the control zones.

It may frequently be additionally desirable to constrain the constraints on control zones at a higher level. For example, one constraint may be used to guarantee that all lower case stems of a particular character are made the same number of pixels in width below a particular character size. Another separate constraint may be used to guarantee that all upper case stems of the same particular character are made the same number of pixels in width below a particular character size. This may be acceptable for character sizes in which, for example, lower case stems would be three pixels wide and upper case stems would be four pixels wide. However, at smaller character sizes, a one-pixel width for lower case character stems while a two-pixel width for upper case character stems would be unacceptable. Therefore, in this case, a higher level constraint is used to constrain the two lower level constraints to be the same value when the scaling of a particular character goes below a threshold size. Higher level constraints normally become effective for character sizes which are smaller than either of the lower level constraints.

The use of constraints on constraints can be continued indefinitely, and is limited only by the ingenuity of the typographic designer. However, all such chains of constraints must eventually lead to an unconstrained constraint.

The use of a constraint mechanism can considerably reduce any ripple effects of calculations that may need to be done between characters. Rather than having to perform individual character scaling operations while referencing other characters, as in the method of U.S. Pat. No. 4,785,391, in the present invention, all the type designer needs to do is specify use of the same constraint for different letters or different zones of the same letter. This results in faster computation, because characters may be scaled individually and completely independently from other characters. There is no need to link to, reference, or compute control zones for other characters, as required in U.S. Pat. No. 4,785,391.

After the positions of all of the x and y control edges have been computed in output device coordinates, the next step is to determine how points on the outline description of the character should be transformed into output pixel coordinates. Points on the character outline that coincide with control edges, are simply transformed to the pixel position of that control edge. For example, with reference to FIG. 8, all of the points of the character outline that coincide with x control edge 58 are simply transformed to the output device pixel position of control edge 12. For points in the character outline 50 in FIG. 8, that do not coincide with a control edge, interpolation is required.

The basic method of interpolation is to transform any point between an arbitrary pair of control edges into the corresponding position between the same control edges in output device coordinates. A point that is midway between two control edges in the high-resolution em-square coordinates is transformed to a point that is midway between the same control edges in the output device pixel space. For example, in FIG. 8, all points between x control edges 58 and 60 are transformed to the corresponding points between control edges 58 and 60 in output device pixels.

Figure 8:
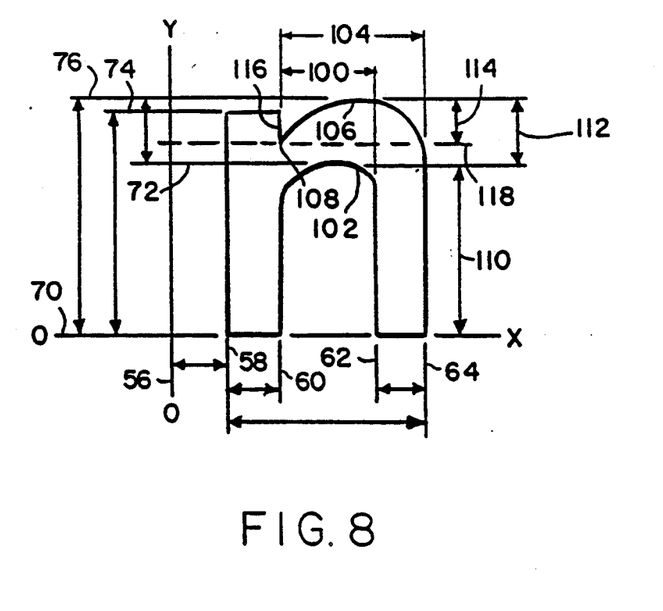
FIG. 8 is a diagrammatic illustration of the interpolation zones in the x-direction and y-direction, defined for the letter "n" of FIG. 7.

As an example of interpolation, FIG. 8 illustrates how interpolation zone assignments might be made, using the lower case "n" as a test case. Interpolation zone 100 is assigned between x control edges 60 and 62. Therefore, the x coordinates of all points representing the inside of the arch of the lower case "n" 102 are interpolated between x control edges 60 and 62. To determine the x output device coordinates of curve 102 in FIG. 8, a linear interpolation function may be used. This would consist, for example, of a multiplication in order to scale the point of interest from outline resolution units to output device pixels plus an addition to compensate for character offset. In the same manner, interpolation zone 104 is used to interpolate all the output device coordinates along the outer curve 106 of the lower case "n" shown in FIG. 8 which lie between x control edges 60 and 64. The assignment of interpolation zones is arbitrary, in that they may be allowed to extend between any pair of control edges, between any pair of x coordinates, or between an pair of y coordinates. For example, an endpoint of an interpolation zone that does not coincide with a control edge is interpolated between a pair of enclosing control edges. As an additional example, an endpoint of an interpolation zone that is beyond the outermost control edges in either the x or y dimension may be interpolated from the outmost control edge. Consequently, a control edge that is used to control one part of the character is not relevant to another part of the character. For example, in FIG. 8, the curve that represents the outer part of the arch 106 passes through x control edge 62, but should not been affected by adjustments to the position of x control edge 62. Therefore, all x coordinates on curve 106 are interpolated between x control edges 60 and 64, thus skipping the irrelevant control edge 62. Since interpolation zones are allowed to cross and ignore irrelevant control edges, a perfectly smooth curve between the control edges of interest may be maintained without any discontinuities occurring. It is further to be appreciated that interpolation zones are not required for portions of the character outline composed of straight lines, even if these straight-lined portions of the characters cross control edges, since there are no intermediate points on the line that require interpolation.

Once all the interpolation zones are assigned for the x coordinates, a similar method is used to assign interpolation zones for all the y coordinates of the character outline. As depicted in FIG. 8, interpolation zone 110 is used to interpolate all y coordinate points on the character outline that fall between control edges 70 and 72. Interpolation zone 112 is used to interpolate all the y output device coordinates on the outer curve 106, while at the same time ignoring irrelevant control edge 74. Finally, since interpolation zones can be assigned arbitrarily, and the beginnings and ends of the interpolation zones do not have to coincide with control edges, improved accuracy may be achieved by making the end of an interpolation zone correspond to the start of a particular typographic feature, rather than to the next enclosing control edge. For example, in FIG. 8, interpolation zone 114, defined by control edge 76 and interpolation edge 118, is used to interpolate the beginning of the outer curve 106 where it meets the vertical stem 116. Interpolation edge 118 defines the intersection of the outer curve 106 and the vertical stem 116 at the vertical location 109. Having interpolation zone 114 extend from control edge 76 to interpolation edge 118 results in higher accuracy and preservation of the typographic feature.

Another advantage of the ability to arbitrarily assign interpolation zones lies in enhanced speed of computations. Sometimes, a single interpolation zone can be used in place of two separate zones without harmful effects. Minimization of the number of interpolation zones is important for the maximization of performance. Such generalization of the interpolation zone end points allows typographic designers to use their expertise to produce high-quality results with a minimum number of interpolation zones.

Figure 9A:
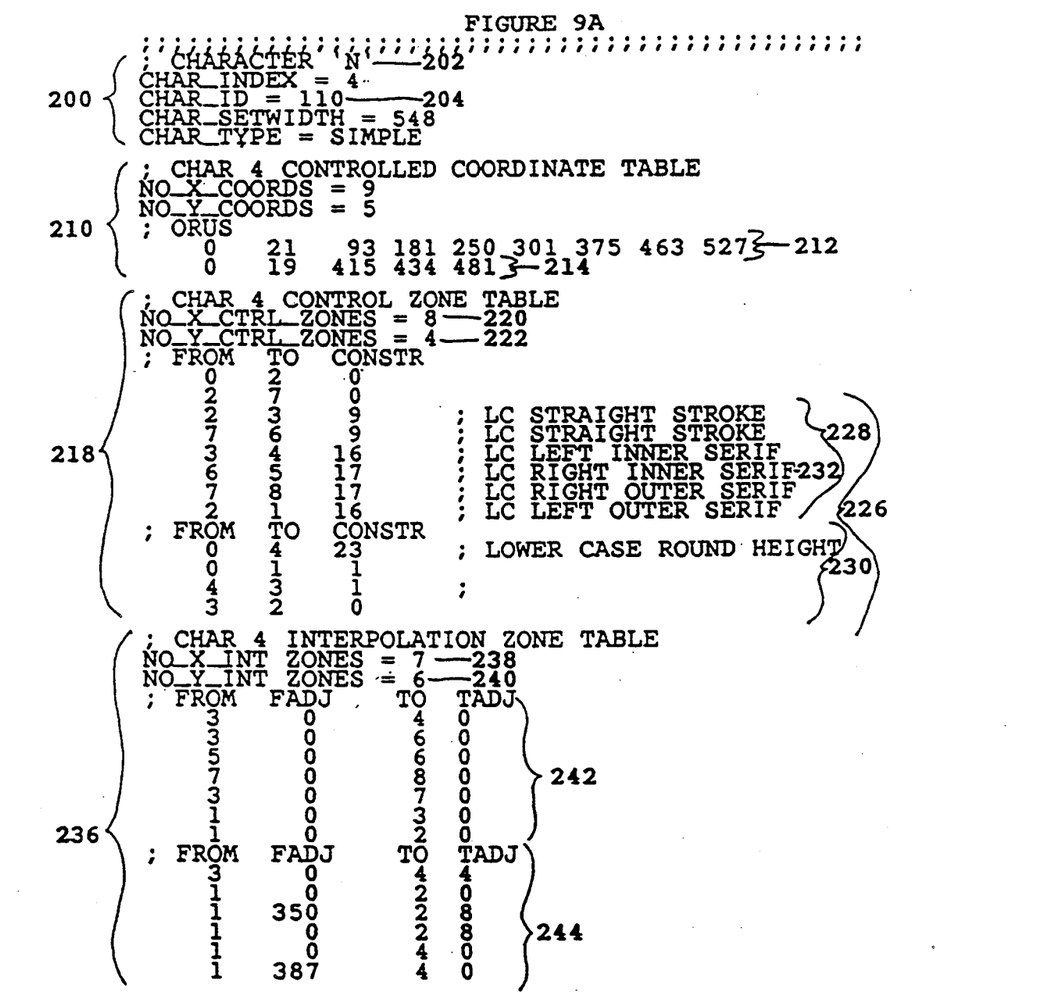
FIGS. 9A and 9B together comprise a listing of an exemplary form of a source file data structure according to the present invention, depicting a listing of the control zones, the interpolation zones, and constraint functions for the letter "n"
Figure 9B:
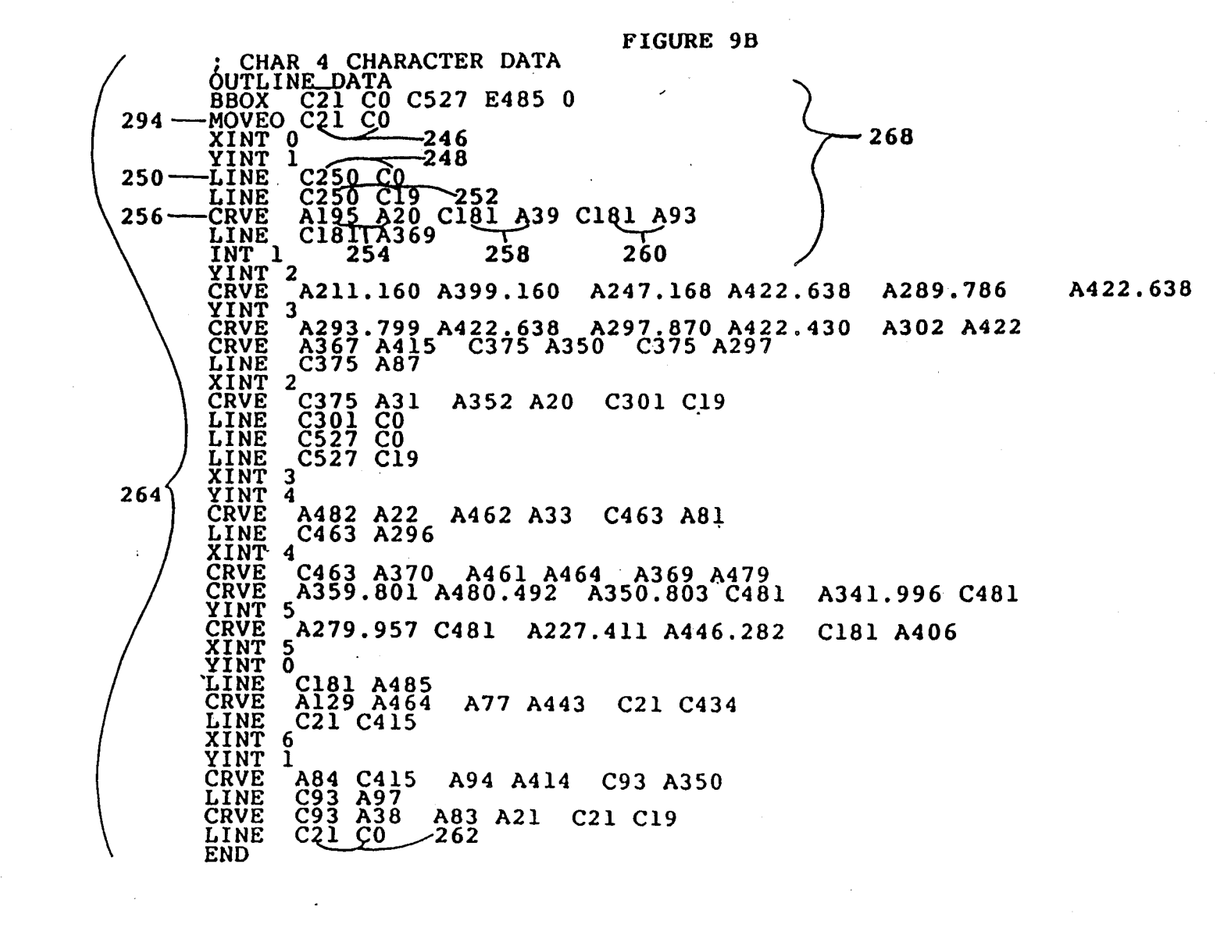
Figure 12:
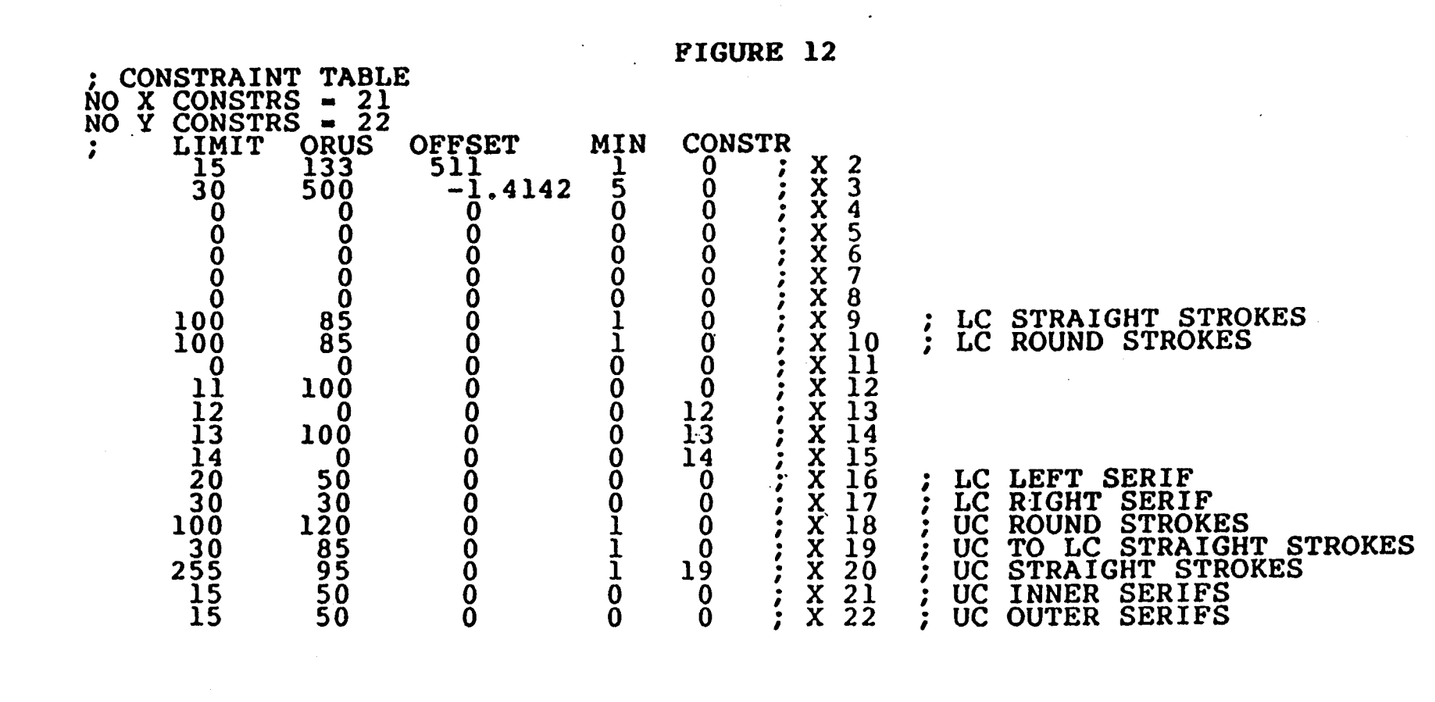
FIG. 12 is a listing of an exemplary form of a source file data structure for a constraint table and data therefor according to the present invention.

The direct result of the control zone definitions, constraint functions, and interpolation zone definitions is a data structure, recorded on magnetic media, for example, which defines a series of steps which will yield the desired bitmap. This information may be embodied in a variety of forms. One embodiment which has proven useful is a source file listing of instructions and arguments. This source file, too, can assume numerous forms. In one exemplary form, a source file may have a format such as that illustrated in FIGS. 9A and 9B. Of course, as will be apparent from the discussion below, not all of the information contained in FIGS. 9A and 9B is required. Some of it is optional. The first data area, or field, 200 in the file of FIG. 9A contains identifying information concerning the particular character. In area 200, for example, the character is identified as character "n" at 202 with a character identification number of 110 at 204. The table 210 contains the locations of the x and y coordinates that form the respective x and y control edges. These coordinates are specified in outline resolution units. In FIG. 9A, the lower case "n" has nine control edges in the x direction and five control edges in the y direction. The next table in the example file is the control zone table 218. As described earlier, the number of control zones must be one less than the number of control edges for both the x and y directions, respectively. In the control zone table 218, the number of x control zones 220 is equal to eight for the lower case "n", and the number of y control zones 222 is equal to four for the lower case "n". The controlled coordinate table 210 gives the starting and ending coordinates for each particular control zone. Constraint function table 226 contains the constraints that apply to particular control zones at particular character sizes. Portion 228 of constraint function table 226 contains the constraints for the x control zones, while portion 220 of constraint function table 226 contains the constraints for the y direction control zones. The FROM field in the constraint function table gives the starting boundary in outline resolution units for the application of the particular constraint. The TO field in the constraint function table gives the ending boundary in outline resolution units for the application of the particular constraint. Finally, the CONSTR field gives the character size in outline resolution coordinates to which the control zone will be constrained for a size bounded by the TO and FROM coordinates. For example, 232 indicates that for outline resolution sizes in the x direction from 6 to 5, the lower case right inner serif of the character "n" will be constrained by constraint number 17 in the constraint table shown in FIG. 12 to be 17 outline resolution units in size, regardless of any changes in the control zone that may describe the size of the lower case right inner serif.

Table 236 in FIG. 9A is the interpolation zone table. For the lower case "n", seven interpolation zones have been assigned in the x direction at 238 and six interpolation zones have been assigned in the y direction at 240. Portion 242 of interpolation zone table 236 contains the outline resolution coordinates defining the seven interpolation zones in the x direction. Portion 244 of interpolation zone table 236 contains the outline resolution coordinates of the six interpolation zones defined in the y direction. As with the control zone table, the FROM column defines the starting coordinate of the particular interpolation zone and the TO column defines the ending coordinates in outline resolution coordinates for the particular interpolation zone. The FADJ and TADJ columns are adjustments to the FROM and TO coordinates. With these adjustment coordinates, the FROM and TO coordinates of the particular interpolation zone can be manually adjusted to maintain for optimum alignment with character features.

As described earlier, that assignment of interpolation zones is arbitrary and is based on maintaining the proper relationship between typographically significant portions of the character. Therefore, the number of interpolation zones does not have to be equal to the number of control zones and the starting and ending coordinates of an interpolation zone do not have to coincide with a control edge. This can be clearly illustrated in FIG. 9A, in which the number of y interpolation zones 240 is equal to 6, while the number of y control zones 222 is equal to 4. It should further be noted that the starting and ending coordinates of the y control zones which are contained in subtable 230 are not the same as the starting and ending coordinates of the y interpolation zones contained in subtable 244.

Finally, with reference to FIG. 9B, table 264 contains the character outline data in outline resolution units for the lower case "n". Subportion 268 shows the outline data used to construct the portion of the character within x interpolation zone 0 and y interpolation zone 1. It is to be noted that the lower case "n" can be constructed by drawing a smooth contour around the entire outline of the character. Consequently, the function MOVEO 266 is used to indicate that the portion of the curve being drawn is the outside outline of the character. The MOVEO function begins at fixed control points 246 which denote the x and y starting points for this curve. A straight line is then drawn from this pair of x,y coordinates to the pair of x,y coordinates 248. The lower case "c" preceding a particular outline resolution coordinate indicates that this coordinate is a controlled coordinate, that is, the coordinate is attached to the associated control edge. The LINE function 250 indicates that a straight line is to be drawn on the outline of the character from coordinates 248 to coordinates 252. The CRVE function 256 is used to indicate that a smooth curve should be drawn between x,y coordinates 252 and x,y coordinates 260, using x,y coordinates 254 and 258 as reference points for a Bezier curve. The lower case "a" preceding a particular outline resolution coordinate indicates that this point is to be interpolated and is not a fixed control point. The process of constructing the outline of the character using lines and curves continues until a contour has been completed, which terminates on the end points where the curve began. In the particular example of the lower case "n" in FIG. 9, it is to be noted that the final ending coordinates 262 are the same as the starting coordinates 246. Consequently, a contour may be constructed, outlining the lowercase "n" which has started and ended at the same point in outline resolution units.

Figure 10:
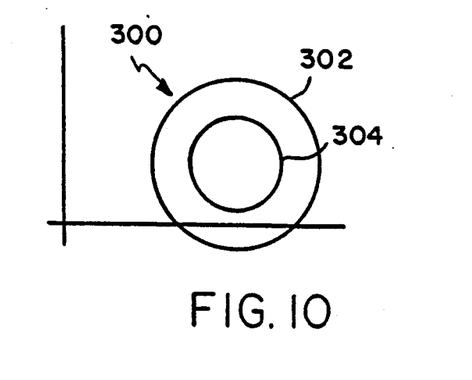
FIG. 10 is a diagrammatic illustration of a lower case "o" shown having an outer closed curve which is separate and independent from the inner closed curve.
Figure 11:
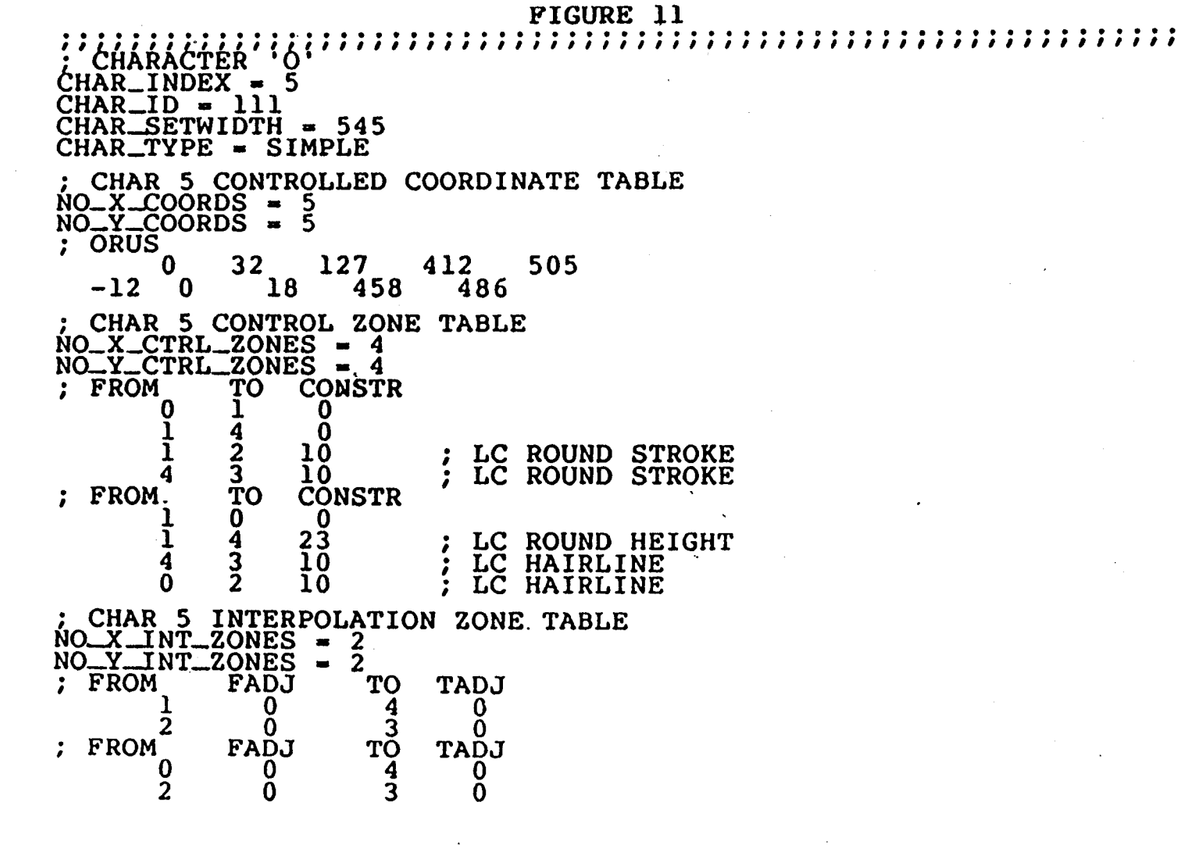
FIG. 11 is a listing of an exemplary form of a source file data structure and data therefor according to the present invention, depicting a listing of the control zones, the interpolation zones, and constraint functions for the lower case letter "o"

In the above example, the outline of the character was created using a smooth curve which followed just the outside edge of the character. In FIG. 10, a lower-case "o" 300 is shown having an outer contour 302 and an inner contour 304. FIG. 11 gives an example for generation of the outline data of a character when the character contains two separate and independent curves defining its outline. In FIG. 11, the data structure for the character "o" is shown. This data structure is similar to the data structure used in FIGS. 9A and 9B, having a control zone table, a constraint function table, and an interpolation zone table.

With regard to the character outline data contained in table 290, it should be noted that there are two separate contours needed to define the lower case "o". Subportion 270 defines the character outline data in outline resolution units needed by the MOVEO function to generate the outer contour 302 of the lower case "o" shown in FIG. 10. MOVEO function 276 indicates that the contour which begins at x,y coordinates 272 and end at x,y coordinates 274 is an outside edge curve.

Subportion 280 defines the character outline data in outline resolution units needed to generate the inner contour 304 of the lower case "o" shown in FIG. 10. The MOVEI function is used to indicate that the closed curve, which begins at x,y coordinates 284 and ends at x,y coordinates 286, is an inside curve and is contained within the curve defined by the MOVEO function.

The control point coordinates in the above examples, that is, the outline resolution coordinates preceding by lower case "c", are fixed control points. Consequently, once these control points have been transformed from outline resolution units into output device coordinates, they may simply be stored in a lookup table which will enhance performance at run time. Also, the constraint functions described in the preceding examples only need to be calculated once when the transformation is done from outline resolution coordinates to output device coordinates. These values may then also be stored in a lookup table. Being able to store these values in a lookup table and then accessing that lookup table at run time greatly enhances the speed of the present method.

Having thus described a specific illustrative embodiment of the invention, it will be readily apparent that various alterations, substitutions and modifications will occur and be obvious to those skilled in the fields of computer graphics, typography and digital typography. All of such obvious alterations, substitutions, and modifications are intended to be suggested herein and encompasssed within the protection sought hereby. Accordingly, this disclosure is presented by way of example only, and is not intended as limiting. Thus, the invention is to be limited only by the claims which follow hereafter.

We claim:

1. A method for use in generating from an outline representation of a character a bitmap representation therefor, at a selectable point size and resolution, the outline representation being defined relative to a high-resolution em-square and the bitmap representation being defined in terms of a low resolution em-square, such method comprising the steps of:

a) defining, for at least one dimension, a plurality of control zones, each having at least a starting control edge and an ending control edge, within the high-resolution em-square, each zone preferably corresponding to a typographic feature of the character;

b) defining, for at least one dimension, a plurality of interpolation zones, each having at least a starting edge and an ending edge;

c) arranging said interpolation zones to produce the best typographic quality in the bitmap representation of the character.

2. The method of claim 1 further comprising the step of:
constraining at least one of said control zones to a predetermined size when the size of said bitmap representation of a character is smaller than a threshold size.

3. The method of claim 1 further comprising the step of
simultaneously constraining at least one of said control zones of a plurality of one or more characters to a predetermined size when the size of said bitmap representation of said different characters is smaller than a second size.

4. The method of claim 3 further comprising the step of:
for a character, constraining a plurality of control zones to a plurality of respective predetermined sizes when the size of the bitmap representation of the character is smaller than a threshold size.

5. The method of claim 4 further comprising the step of:
arranging the respective predetermined control zone sizes in a hierarchy.

6. The method of claim 4 wherein the hierarchy is arranged according to the typographic importance of the respective control zone.

7. The method of claim 1 further comprising the step of:
establishing for each of said control edges, a correspondence between its position in the high-resolution em-square and a position in the low-resolution em-square.

8. The method of claim 7 further comprising the step of:
using each of said interpolation zones to establish a correspondence for each point on said outline representation of a character that is contained within an interpolation zone and does not coincide with a control edge, between their positions in the high-resolution em-square and a position in the low-resolution em-square.

9. The method of claim 7 or claim 8 wherein the low-resolution em-square comprises a finite number of pixels, and including the additional step of:
rounding, to the nearest whole number of pixels, the number of pixels in each control zone in the low-resolution em-square.

10. The method of claim 7 wherein the low-resolution em-square comprises a finite number of pixels, and the step of establishing correspondence includes the step of:
rounding, to the nearest whole pixel, the positions of the control edges in the low-resolution em-square.

11. The method of claim 7 wherein the low-resolution em-square comprises a finite number of pixels, and including the additional step of:
allocating the pixels in the low-resolution em-square according to the relative sizes of the control zones for each dimension in the outline representation of the character.

12. The method of claim 11 further comprising the step of:
rounding, to the nearest whole number of pixels, the number of pixels in each control zone in the low-resolution em-square.

13. The method of claim 1 wherein characters are represented in the high-resolution em-square by a combination of curves and straight lines.

14. The method of claim 13 wherein the curves comprises Bezier curves.

15. The method of claim 1 wherein the size of the character in the bitmap representation is less than twenty five points.

16. The method of claim 1 wherein the resolution of the character in the bitmap representation is less than six hundred resolution units per inch.

17. A digital font for use in generating a bitmap representation of a selected character from a digital representation of the outline of said character, comprising, in a digital storage medium having a plurality of locations capable of storing digital information:
a first set of storage locations containing data representing x-oriented control zones, each zone corresponding to a typographic feature of the character; and
a second set of storage locations containing data representing y-oriented control zones, each zone corresponding to a typographic feature of the character.

18. The digital font of claim 17 further having:
a third set of storage locations containing data representing x-oriented interpolation zones; and
a fourth set of storage locations containing data representing y-oriented interpolation zones.

19. The digital font of claim 17, further comprising:
a fifth set of storage locations containing data representing constraint functions, each constraint function being associated with an indicator of a threshold size bitmap representation of the character for which the constrain function is operative.

20. The digital font of claim 19 wherein the data for at least one constraint function includes a control zone size, to which the control zone is set when the constraint function is operative.

21. The digital font of claim 19, wherein the constraint functions are arranged in a hierarchy.

22. The digital font of claim 21 wherein the hierarchy is organized according to typographic importance of character features.

23. The digital font of claim 17 wherein the storage locations are embodied in magnetic media.

24. The digital font of claim 17 wherein the storage locations are embodied in semiconductor memory media.

25. The digital font of claim 24 wherein the semiconductor memory media comprises a read-only memory.

26. A method for converting a two-dimensional high-resolution outline representation of a character to a two-dimensional low-resolution bitmap representation of the character at a selectable point size and resolution including the steps of:
a) breaking the character into a plurality of control zones oriented in each in each of the two dimensions, each control zone corresponding to a typographic feature; and
b) mapping the typographic features, as a function of the information contained in the control zones in each of the two character dimensions, from the high resolution representation to the bitmap representation of the character at a selected size.

27. The method of claim 26 wherein the step of mapping includes selecting, for each control zone, a scaling factor appropriate to map the extent of the control zone to an integral number of pixels in the bitmap representation.

28. The method of claim 26 further comprising the step of:

provided a plurality of constraint functions, each constraint being operative for sizes below a threshold size bitmap representation of the character and for respectively constraining a size of a control zone corresponding to a typographic feature of the character to a predetermined size when the bitmap representation of the character is smaller than the threshold size for which the constraint function is operative.

29. The method of claim 28 further comprising the step of:

arranging the plurality of constraint functions in a hierarchy according to the relative importance of the typographic feature respectively corresponding to each control zone.

30. The method of claim 29 further comprising the step of:

simultaneously constraining to a predetermined size at least one control zone for each of a plurality of characters when the bitmap representation of one of the characters is smaller than the threshold size for which the constraint function is operative.

31. A method for converting a two-dimensional high-resolution outline representation of a character to a two-dimensional low-resolution bitmap representation of the character at a selectable point size and resolution including the steps of:

a) defining for the character, in at least one of the two dimensions, at least one control zone, each control zone corresponding to a typographic feature; and b) mapping the typographic features, as a function of the information contained in the control zones, from the high resolution representation to the bitmap representation of the character at a selected size, said mapping step including the steps of (1) scaling the control zone from its size in high-resolution outline units to a corresponding number of pixels in bitmap space, and (2) rounding said number of pixels to the nearest integer number.

32. The method of claim 31 wherein the size of the character in the bitmap representation is less than twenty-five points.

33. The method of claim 31 wherein the resolution of the character in the bitmap representation is less than six hundred resolution units per inch.

34. In a computer processing system, a method for generating a two-dimensional low-resolution bitmap representation of a character at a selectable point size and resolution, from a two-dimensional high-resolution outline representation of the character including information defining for the character, in at least one of the two dimensions, at least one control zone, each control zone corresponding to a typographic feature, comprising mapping each typographic feature, as a function of the information contained in the corresponding control zone, from the high resolution representation to the bitmap representation of the character at the selected size, said mapping including the steps of (1) scaling the control zone from its size in high-resolution outline units to a corresponding number of pixels in bitmap space, and (2) rounding said number of pixels to the nearest integer number.

35. The method of claim 34 wherein the size of the character in the bitmap representation is less than twenty-five points.

36. The method of claim 34 wherein the resolution of the character in the bitmap representation is less than six hundred resolution units per inch.

37. A computer processing system for generating a two-dimensional low-resolution bitmap representation of a character at a selectable point size and predetermined resolution, from a two-dimensional high-resolution outline representation of the character, comprising:

a. memory media providing, for each such character, information defining for the character, in at least one of the two dimensions, at least one control zone, each control zone corresponding to a typographic feature; and b. means for mapping each typographic feature, as a function of the information contained in the corresponding control zone, from the high resolution representation to the bitmap representation of the character at the selected size, including means for (1) scaling the control zone from its size in high-resolution outline units to a corresponding number of pixels in bitmap space, and (2) rounding said number of pixels to the nearest integer number.

38. The method of claim 37 wherein the size of the character in the bitmap representation is less than twenty-five points.

39. The method of claim 37 wherein the resolution of the character in the bitmap representation is less than six hundred resolution units per inch.

* * * * *